United States Patent [19]

Marino, Jr. et al.

[11] Patent Number: 4,987,595
[45] Date of Patent: Jan. 22, 1991

[54] SECURE CRYPTOGRAPHIC PROCESSOR ARRANGEMENT

[75] Inventors: Joseph T. Marino, Jr., Fountain Hills; Ronald S. Core, Glendale, both of Ariz.

[73] Assignee: Motorola, Inc., Schaumburg, Ill.

[21] Appl. No.: 405,157

[22] Filed: Sep. 11, 1989

[51] Int. Cl.⁵ ............................................. H04L 9/02
[52] U.S. Cl. .................................... 380/50; 380/4; 364/222.5; 364/918.7
[58] Field of Search .................... 380/23, 25, 3, 4, 49, 380/50; 364/222.5, 918.7, 964.3

[56] References Cited

U.S. PATENT DOCUMENTS

| | | | |
|---|---|---|---|
| 4,278,837 | 7/1981 | Best ............................................. | 380/4 |
| 4,352,952 | 10/1982 | Boone et al. .............................. | 380/49 |
| 4,646,234 | 2/1987 | Tolman et al. ...................... | 380/4 X |
| 4,670,857 | 6/1987 | Rackman .................................. | 380/4 |
| 4,847,902 | 7/1989 | Hampson .................................. | 380/4 |

Primary Examiner—Nelson Moskowitz
Assistant Examiner—Tod Swann
Attorney, Agent, or Firm—Frank J. Bogacz

[57] ABSTRACT

A secure processor arrangement for a communications secure kernel of a secure processor system. This processor arrangement provides protection of plain text data and suitable isolation of data necessary to support single processor architecture. A red memory subsystem stores plain text data and a black memory subsystem stores cypher text data. In order to prevent mishandling of plain text data, the single processor is allowed to directly read and to write red memory, but the single processor is only permitted to directly read from the black memory.

10 Claims, 2 Drawing Sheets

SECURE CRYPTOGRAPHIC PROCESSOR ARRANGEMENT

BACKGROUND OF THE INVENTION

The present invention pertains to a secure communications system and more particularly to a processor architecture having a single control element which provides control of data transfer between cypher text data memory (black) and plain text data memory (red).

Modern day communications systems are controlled by central processing units (CPU). These CPUs or processors control the flow of data within the system. Secure processor arrangements have previously included separate processors, one for each kind of data (red and black). A red processor worked with the red data memory and a black processor worked with the black data memory. When data is to be exchanged, for encrypting or decrypting, an elaborate data transfer was required. The data transfer was a series of messages exchanged between the red and black processors. The data was sent to the encrypt/decrypt function and did not pass through the processors. As a result the red processor handles only red (unencrypted or plain text messages) data and the black processor handles only black data (encrypted or cypher text messages).

The two processors required to handle data under the previous system were an implementation of the two man security rule. In the two processor system, a failure in either processor would not compromise security. That is, secure data could not be compromised, if only one of the processors were found to be compromised. Further, since two processors require two bus structures, there are more places where security failures may occur.

Accordingly, it is an object of the present invention to provide single controlling processor for a secure red/black memory system which provides equivalent assurances to the two man security rule while minimizing the amount of circuitry and the number of places which are susceptible to security failure.

SUMMARY OF THE INVENTION

In accomplishing the object of the present invention, a novel secure cryptographic processor architecture arrangement is shown.

A secure processor system includes a secure processor arrangement for restricting access to a memory subsystem. The arrangement includes a processor with controlled read and write accesses to the memory subsystem.

The memory subsystem includes red and black memories. Both memories are connected to the processor. The red memory operates under control of the processor to store and to transmit plain text data. The black memory operates to store and to transmit cypher text data.

The processor is enabled for read and write accesses to the red memory for plain text data. The processor is enabled for read accesses only for reading the cypher text data from the black memory. This prevents storing and plain text data in the black memory.

DESCRIPTION OF THE PREFERRED EMBODIMENT

Figure 1:
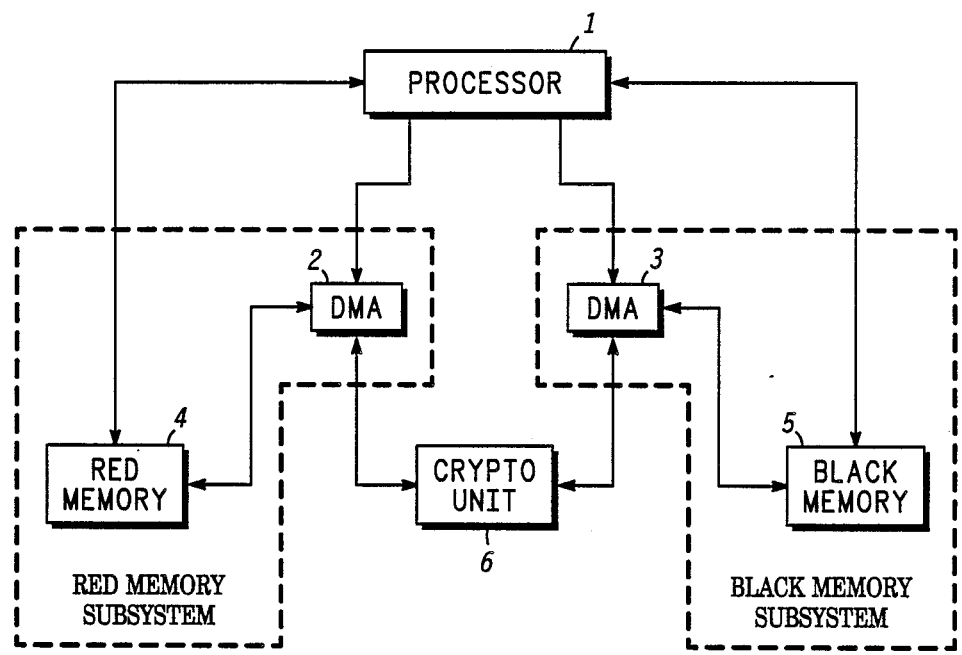
FIG. 1 is a block diagram depicting the principles of operation of the present invention.

Referring to FIG. 1, a block diagram of the single processor secure architecture is shown. FIG. 1 is a block diagram embodying the principles of operation of the present invention. Processor 1 is connected to direct memory access (DMA) units 2 and 3. DMAs 2 and 3 are connected to crypto unit 6. DMA 2 is connected to red memory unit 4. DMA 3 is connected to black memory unit 5.

DMA unit 2 and red memory 4 comprise the red memory subsystem (shown in dashed lines). Similarly, DMA unit 3 and black memory 5 comprise the black memory subsystem (shown in dashed lines).

Processor 1 is connected to red memory 4. Processor 1 may both read and write red memory 4. Processor 1 is also connected to black memory 5. Processor 1 may only read from black memory 5.

It is to be noted that processor 1 may not read red data from red memory 4 and write this data, inadvertently or otherwise, into black memory 5. Since red data is plain text, security would be compromised, if it were stored into black memory 5 which contains only cypher text. By so constraining processor 1, security of red data is maintained. In addition, a single control processor handles the data transfer. The single processor eliminates the extensive bussing and message transfer required by multiple processors. The single processor arrangement also eliminates the need for extensive circuitry and the physical space associated with the circuitry.

Normally, data which is to be output is moved from the red memory 4 to the black memory 5. Data which is to be input to the system (not shown) is transferred from the black memory 5 to the red memory 4.

For the outputting of data, plain text data which is stored in red memory 4 must be encrypted and stored in black memory 5 for output to another system. Since processor 1 cannot directly read data from red memory 4 and write this data into black memory 5, intermediate steps are used to achieve the data transfer. Processor 1 determines where the data resides in red memory 5 and the length of the data, assuming the data is in contiguous block form. Processor 1 then instructs DMA unit 2 to read data from red memory 4 and gives DMA 2 the starting address and the length of the data.

Next the plain text data from red memory 4 is encrypted by crypto unit 6. The encrypted data is now cypher text data and may be stored into black memory 5. DMA unit 3 receives instructions from processor 1 that the encrypted data from crypto unit 6 is to be stored in black memory 5. Processor 1 transmits the starting address of the data and the length of the encrypted data, assuming the data is in a contiguous block, to DMA 3. Then DMA 3 controls the writing of the encrypted data to black memory 5. Once the encrypted data is stored in black memory 5, it may be safely retransmitted. At the same time the integrity of the system is maintained while being controlled by a single processor.

Similarly for transfers of cypher text (encrypted) data to plain text data, the above process is reversed. Processor 1 instructs DMA 3 to read data from black memory 5 and gives DMA 5 the starting address and the length of the cypher text data. DMA 3 reads the data from black memory 5 and transfers the data to crypto unit 6. Crypto unit 6 decrypts the cypher text into plain text.

Processor 1 instructs DMA 2 where to store the plain text data in red memory by giving DMA 2 the starting address and the length of the plain text data. DMA 2 then stores the plain text data, which is received from crypto unit 6, in red memory 4 at the appropriate place.

Figure 2:
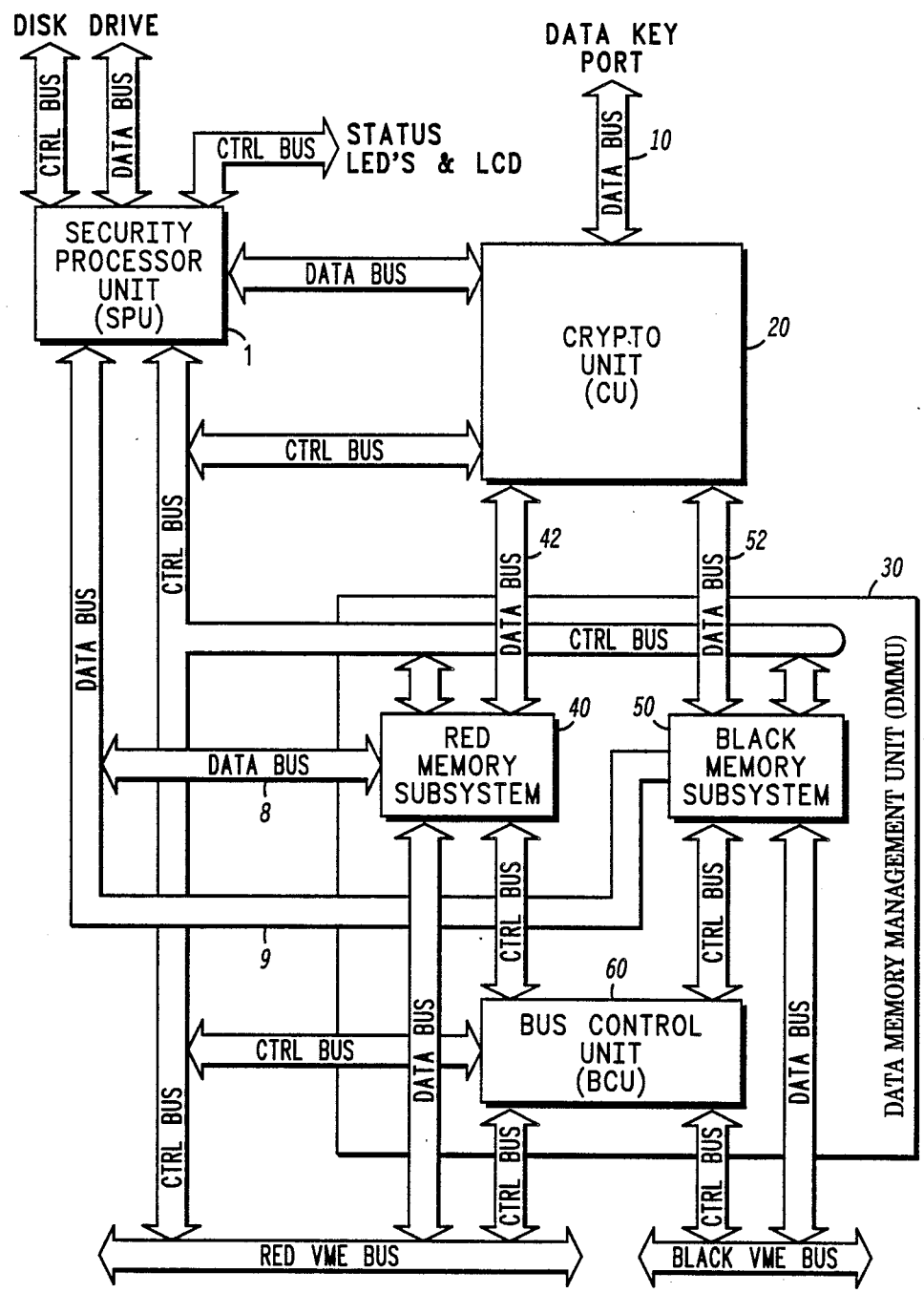
FIG. 2 is a more detailed block diagram of secure processor arrangement of the present invention.

FIG. 2 depicts a block diagram of the security kernel of the present processor arrangement. Security Processor Unit (SPU) 1 is the processor 1 of FIG. 1. SPU 1 provides for interfacing to a disk drive (not shown) via data and control buses. In addition, SPU 1 provides status outputs light emitting diodes (LEDs) and a liquid crystal display (LCD) (both not shown).

SPU 1 is connected to the Crypto Unit (CU) 20. The CU 20 isolates the key management functions performed by the security kernel. CU 20 includes a security algorithm controller. The security algorithm controller includes the key generator which may produce public or classified keys.

SPU 1 is connected to the Crypto Unit 20 for key data transfer. Key data is transmitted to CU 20 via data key port 10, where data is used to encrypt plain text data. The crypto unit 20 performs the encryption/decryption with the appropriate key data. The CU protects internal data from hardware or software control failures while allowing high speed continuous traffic encryption or decryption of data to proceed. The CU 20 presents a defensive interface to the SPU 1. CU 20 requires that appropriate registers be loaded by SPU 1 before the CU 20 processes the requests of the SPU 1. If errors are detected by the CU 20, CU 20 responds with command error interrupts. If the error is capable of causing a critical security event to occur, then an alarm is generated by the CU 20. SPU 1 displays this status on the LEDs and LCD devices.

SPU 1 has data bus and control bus leads. The CU 20 is connected to SPU 1 via the control bus leads. Both Red Memory Subsystem (RMS) 40 and Black Memory Subsystem (BMS) 50 are connected to the data bus and control bus leads of SPU 1. It is to be noted that the connection 8 of RMS 40 to SPU 1 is bi-directional. That is, SPU 1 may both read and write to RMS 40. However, the SPU 1 access to the BMS 50 is a read only type access via leads 9. Note that the access by SPU 1 to the Black Memory Subsystem 50 is a one way access. This access is a read only access. As a result of this built-in mechanism, SPU 1 may not write directly into the BMS 50 without the data being sent through the CU 20. SPU 1 may not inadvertently write any plain text data into the BMS 50. This guarantees that plain text data will not be stored into the Black Memory Subsystem 50 by the Security Processor Unit 1.

The Black 50 and Red 40 Memory Subsystems are included in the Data Memory Management Unit 30 (DMMU). In addition, Bus Control Unit (BCU) 60 in included in the DMMU 30. BCU 60 is connected to SPU 1 via the control bus leads. Also, BCU 60 is connected by data and control busses to RMS 40 and to BMS 50. BCU 60 is also connected to the red VME bus and to the black VME bus via control busses.

Red VME bus is connected to the control bus leads of SPU 1. Red VME bus is connected to RMS 40 via a data bus. Black VME bus is connected to BMS 50 via a data bus. Red VME bus is connected to BCU 60 via the control bus leads. Black VME bus is also connected to BCU 60 via its control bus leads. The red and black VME busses are parallel busses which allow communication of the security kernel with other devices or other secure processors. All data transfer on the red and black VME busses are accomplished under program control of SPU 1. The SPU 1 may not directly access either the Red VME bus or the Black VME bus. Data transfers to the black VME bus are accomplished by sending data through the BMS 50 which receives encrypted data from CU 20.

SPU 1 directly accesses data stored in Red Memory Subsystem via the data bus 8. SPU 1 may read or write data to RMS 40. The Red Memory Subsystem is secure, electronically and physically, and contains the plain text data as mentioned above. As long as SPU 1 reads and writes to/from the only RMS 40, data security is maintained.

SPU 1 may access the Black Memory Subsystem via data bus 9 in the read only mode. This prevents the SPU 1 from writing plain text data to the BMS 50 and thereby compromising system security.

The Red and Black Memory Subsystems each include a corresponding memory and a DMA controller, as shown in FIG. 1. When the SPU 1 is to write data to the Black Memory Subsystem 50, the data must first be read from the Red Memory Subsystem 40. To accomplish this SPU 1 sets the DMA of RMS 40 with the starting address of the data and the length of the data. The DMA then transfers the requested data via data bus 42 to the CU 20 where it is encrypted. The encrypted data is then transmitted to the DMA of Red Memory Subsystem 50 via the data bus 52. SPU 1 has already set the starting address and the length of the data in the DMA of BMS 50. As the DMA receives the encrypted data, it is stored in black memory subsystem 50 beginning at the appropriate address.

The SPU 1 may read data directly from the BMS 50. However this data is encrypted and must be converted to plain text to be useful to the system or to be read by human beings. For reading data from the BMS 50 the process is reversed. SPU 1 first sets the DMA of BMS 50 with the starting address and the length of the data. Data is read from the BMS 50 and transferred to the CU 20 via data bus 52. CU 20 decrypts the data. SPU 1 has programmed the DMA of RMS 40 to store the decrypted data at a particular starting address for a number of data words. The DMA of RMS 40 then receives the data from CU 20. This DMA then stores the data in the corresponding memory of RMS 40. SPU 1 may then read the decrypted data.

This secure processor architecture is useful for single processor controlled systems. Interfaces between processor pairs or three party configurations are eliminated. A high data through-put rate is achieved. The single processor is prevented from writing plain text data to the memory which contains cypher text. Therefore, data security may not be compromised by the system processor.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a secure processor system, a secure processor arrangement for restricting access by a processor of said secure processor system to a memory subsystem, said secure processor arrangement comprising:

processor means for controlling write and read access to said memory subsystem;

said memory subsystem including first and second memory means, said first and second memory means being connected to said processor means, said first memory means operating under control of said processor means to store and to transmit plain text data, said second memory means operating under control of said processor means to store and to transmit cypher text data;

crypto means;

said first memory means being connected to said processor means for enabling said read and said write accesses by said processor means to said plain text data;

said memory subsystem further includes first direct memory access means connected to said first memory means, to said processor means and to said crypto means, said first direct memory access means operating, under control of said processor means, to transfer said plain text data from said first memory unit means directly to said crypto means for conversion to said cypher text data;

said second memory means being connected to said processor means for enabling said read access only by said processor means to said cypher text data; and said memory subsystem further includes second direct memory access means connected to said second memory means, to said processor means and to said crypto means, said second direct memory assess means operating, under control of said processor means, to transfer said cypher text data from said second memory means directly to said crypto unit means for conversion to said plain text data.

2. A secure processor arrangement as claimed in claim 1, wherein said crypto means is connected between said first and second memory means, said crypto means operating to encrypt said plain text data of said first memory means and said crypto means further operating to decrypt said cypher text data of said second memory means.

3. A secure processor arrangement as claimed in claim 2, said processor means being connected to said crypto means, said crypto means operating, under control of said processor means, to transfer said encrypted plain text data (cypher text data) to said second memory means for storage and said crypto means further operating, under control of said processor means, to transfer said decrypted cypher text data (plain text data) to said first memory means for storage.

4. A secure processor arrangement as claimed in claim 1, wherein said processor means includes a single processor means.

5. A secure processor arrangement as claimed in claim 3, said processor means including data bus means connected to said first memory means for providing said read and write accesses by said processor means directly to said first memory unit means.

6. A secure processor arrangement as claimed in claim 5, said data bus means of said processor means being connected to said second memory means for providing said read only access by said processor means directly to said second memory unit means.

7. A secure processor arrangement as claimed in claim 6, said processor means further including control bus means being connected to said crypto means, to said first memory unit means, to said first direct memory access means, to said second memory unit means and to said second direct memory access means.

8. A secure processor arrangement as claimed in claim 7, said memory subsystem further including bus control unit means providing for serial to parallel and parallel to serial high speed interface to said first and second memory means, said bus control unit means being connected to said first and second memory unit means and to said control bus of said processor means.

9. A secure processor arrangement as claimed in claim 8, wherein there is further included:

first parallel bus means connected to said bus control unit means, to said first memory unit means, and to said processor means via said control bus for providing a parallel data transfer interface; and second parallel bus means connected to said bus control unit means and to said second memory unit means for providing a parallel data transfer interface.

10. A secure processor arrangement as claimed in claim 9, said processor means including:

disk drive interface means for interfacing a disk drive to said processor means; and status output means for providing an indication of the operation of the secure processor arrangement to a human.

* * * * *